United States Patent
Häsler

(10) Patent No.: US 6,866,455 B2
(45) Date of Patent: Mar. 15, 2005

(54) CONNECTING MEMBER FOR CONNECTING TWO STRUCTURAL COMPONENTS

(75) Inventor: Georg Häsler, Nagold (DE)

(73) Assignee: Häfele GmbH & Co., Nagold (DE)

( * ) Notice: Subject to any disclaimer, the term of this patent is extended or adjusted under 35 U.S.C. 154(b) by 27 days.

(21) Appl. No.: 10/286,460

(22) Filed: Nov. 1, 2002

(65) Prior Publication Data

US 2003/0118397 A1 Jun. 26, 2003

(30) Foreign Application Priority Data

Nov. 9, 2001 (DE) .................................... 201 18 279 U

(51) Int. Cl.⁷ ................................................ F16B 13/04
(52) U.S. Cl. ......................... 411/21; 411/71; 411/57.1; 411/913; 403/297
(58) Field of Search ............................. 411/21, 22, 32, 411/57.1, 71–73, 388, 508, 913; 403/373, 374.1–374.4, 297, 409.1, DIG. 12; 29/525.02, 525.03, 525.04

(56) References Cited

U.S. PATENT DOCUMENTS

| | | | | | |
|---|---|---|---|---|---|
| 688,756 | A | * | 12/1901 | Tripp ........................... | 411/50 |
| 1,935,367 | A | * | 11/1933 | Bebie et al. .............. | 242/613.5 |
| 3,027,609 | A | * | 4/1962 | Parkin et al. ............... | 403/297 |
| 3,027,670 | A | * | 4/1962 | Kramer et al. ........... | 428/542.4 |
| 4,834,601 | A | * | 5/1989 | Schaap ....................... | 411/340 |
| 5,567,081 | A | * | 10/1996 | Vallance ..................... | 403/292 |

FOREIGN PATENT DOCUMENTS

| | | |
|---|---|---|
| DE | 296 20 985 U1 | 3/1997 |
| EP | 0940587 | 9/1999 |
| WO | 9840634 | 9/1998 |

* cited by examiner

Primary Examiner—William L. Miller
(74) Attorney, Agent, or Firm—Friedrich Kueffner

(57) ABSTRACT

A connecting element for connecting two structural components, particularly furniture plates, includes a sleeve with an upper part and a lower part and a bolt having a rearward bolt end and a forward bolt end mounted in the sleeve. The lower part of the sleeve together with the rearward end of the bolt can engage in a recess of a first structural component and the upper part of the sleeve and the forward end of the bolt can engage in a recess of a second structural component and a head of the bolt at the forward end of the bolt can engage in a supporting or clamping device arranged in the second structural component. At least one brace is mounted on a portion of the upper part of the sleeve adjacent the lower part of the sleeve, wherein the at least one brace extends obliquely outwardly towards the lower part of the sleeve and is pivotably towards the sleeve.

6 Claims, 3 Drawing Sheets

CONNECTING MEMBER FOR CONNECTING TWO STRUCTURAL COMPONENTS

BACKGROUND OF THE INVENTION

1. Field of the Invention

The present invention relates to a connecting member for connecting two structural components, particularly furniture plates. The connecting member includes a bolt mounted in a sleeve which is composed of an upper part and a lower part. The lower part of the sleeve engages together with the rearward end of the bolt in a recess of the first structural component and the upper part of the sleeve engages with the forward end of the bolt in a recess of the second structural component, and the head of the bolt interacts with a supporting or clamping device arranged in the second structural component.

2. Description of the Related Art

In connections which are subjected to low loads, it is sufficient if the lower part of the sleeve is held in its recess by means of hook-shaped elements. In that case, the bolt is secured in the lower part of the sleeve, on the one hand, and the bolt is secured with its head in a supporting device in the second structural component, on the other hand. However, in most cases, the connections are subjected to very high loads and it is necessary to achieve a secure connection of the lower part of the sleeve. Used for this purpose is an expanding sleeve which is axially displaced by means of a clamping device which receives the head of the bolt. As the bolt is axially moved, it expands with its conically constructed end the lower part of the sleeve and presses the lower part of the sleeve against the wall of the recess.

For connecting the two structural components, the recesses are drilled first and the supporting or clamping device is mounted. Either the lower part of the sleeve or the upper part of the sleeve are then placed in the respective recesses of the structural components. Subsequently, the other structural component is mounted by being slid with its recess onto the other sleeve part. In order to ensure that the bolt head can always engage in the supporting or clamping device, the drilling depth of the recesses at least for the lower part of the sleeve should not exceed a certain depth. However, in practical operation, it is not always possible to prevent the manufacture of bores which are too deep; for this reason, for ensuring a precise positioning of the sleeve in its recesses, an annular stop has been provided between the lower and upper parts of the sleeve, so that mounting of the lower part of the sleeve which is too deep is always prevented. However, if the assembly is to be carried out in such a way that the bolt head is first placed in the supporting or clamping device and, if this recess has been drilled too deep, the annular stop shoulder prevents the bolt head from being placed in the supporting or clamping device, so that a sleeve without stop must be used in these cases.

SUMMARY OF THE INVENTION

It is the primary object of the present invention to provide a connecting member of the above-described type which can be used independently of the type of assembly being carried out.

In accordance with the present invention, arranged on a portion of the upper part of the sleeve adjacent the lower part of the sleeve are one or more braces which extend obliquely outwardly in the direction towards the lower part of the sleeve and are pivotably towards the sleeve.

When the lower part of the sleeve is initially placed, the outwardly protruding braces act as a stop at the structural component, so that independently of the depth of the recess an always uniform location of the lower part of the sleeve within the respective structural component is achieved. When the structural component is subsequently mounted, the braces are forcibly pivoted towards the sleeve by the wall of the recess, so that the stop effect is cancelled.

However, if the upper part of the sleeve is placed first, wherein the bolt head is placed in the supporting and clamping device, the braces are also pivoted towards the sleeve. In this case, the stop effect is again cancelled and the lower part of the sleeve can be positioned independently of the depth of the recess of the other structural component.

While it is usually already sufficient to press the braces against the sleeve for eliminating the stop effect, the stop effect can be eliminated with absolute certainty when the braces can be pivoted into slots of the upper part of the sleeve, so that the braces then extend flush with the sleeve surface.

In accordance with a preferred embodiment, the braces are of the same material as the sleeve. If the braces are made of an elastic material, it is not required to provide special hinges, for example, film-type hinges, in order to make it possible that the braces pivot. The lower part of the sleeve is provided with hook-shaped annular ribs at its outer circumference and the upper part of the sleeve has longitudinally directed guide or spacer ribs.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
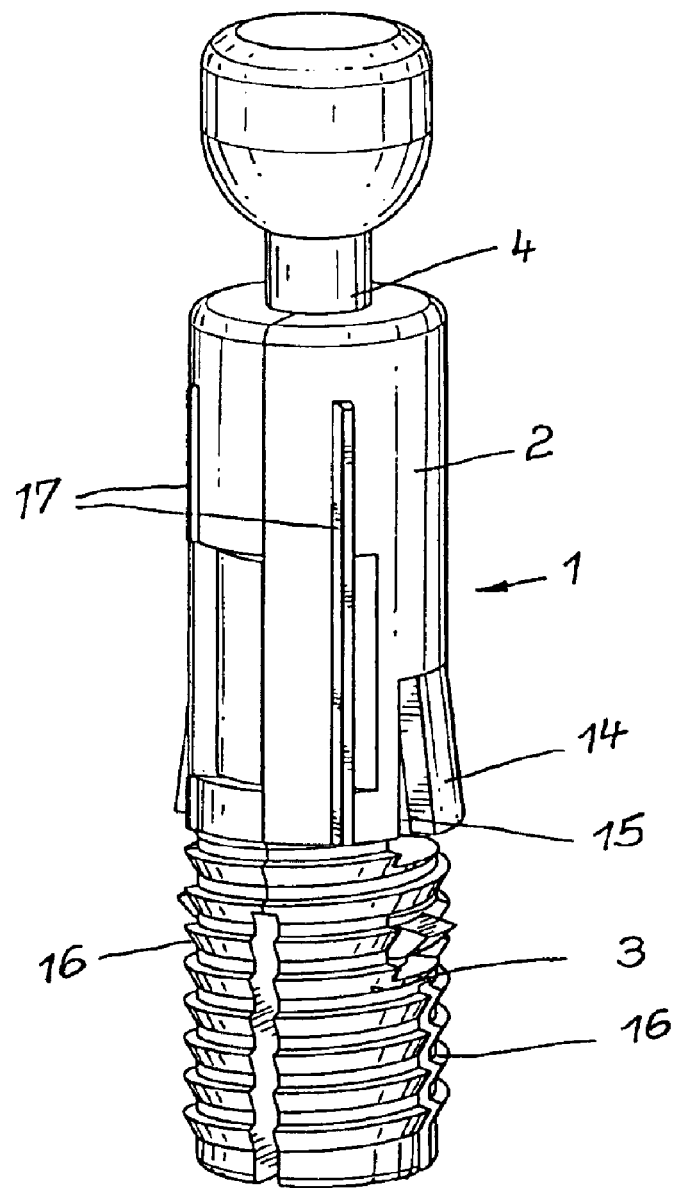
FIG. 1 is a perspective view of a connecting element according to the present invention.

As shown in the drawing, a sleeve 1 is composed of an upper part 2 and a lower part 3, wherein a bolt 4 is longitudinally slidably mounted in the sleeve 1. A bolt head 6 is provided at the forward end 5 of the bolt 4 and an expanding cone 8 is provided at the rearward end 7 of the bolt 4.

Figure 2:
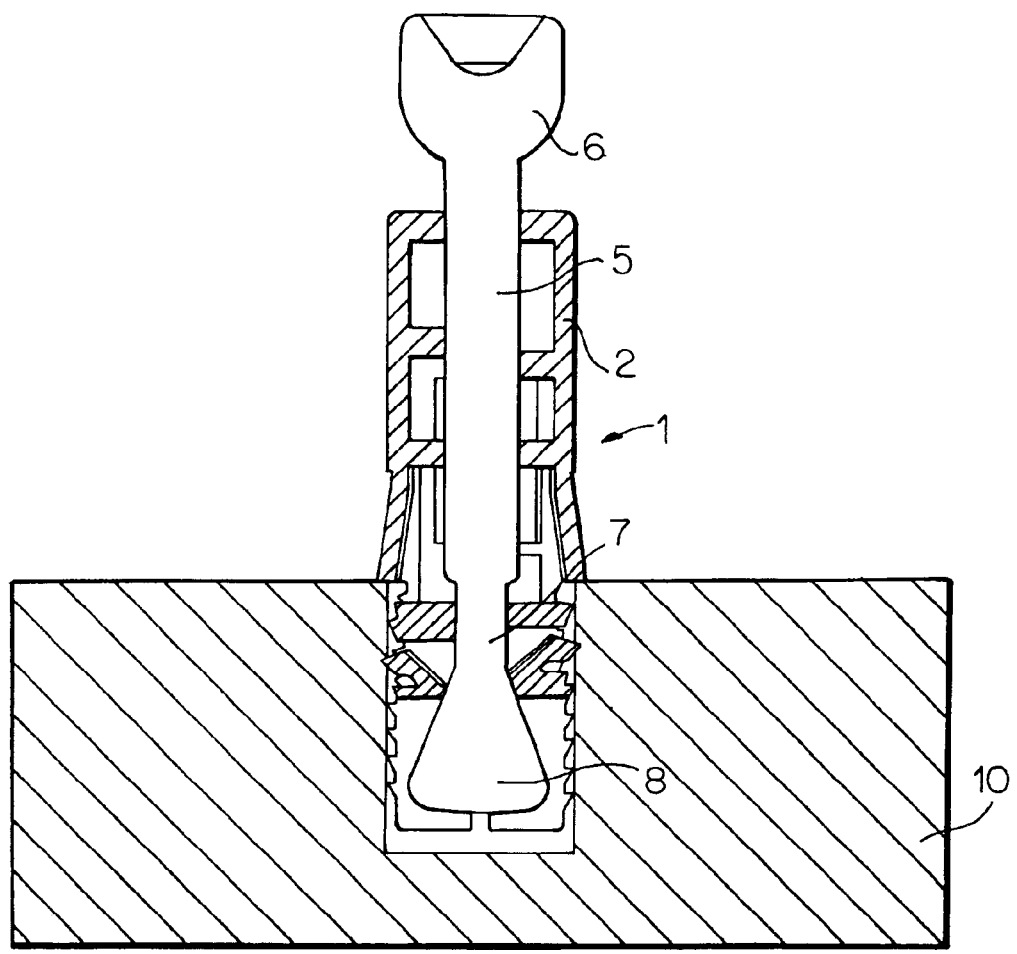
FIG. 2 is a cross-sectional view of a connecting element placed in a first structural component.
Figure 3:
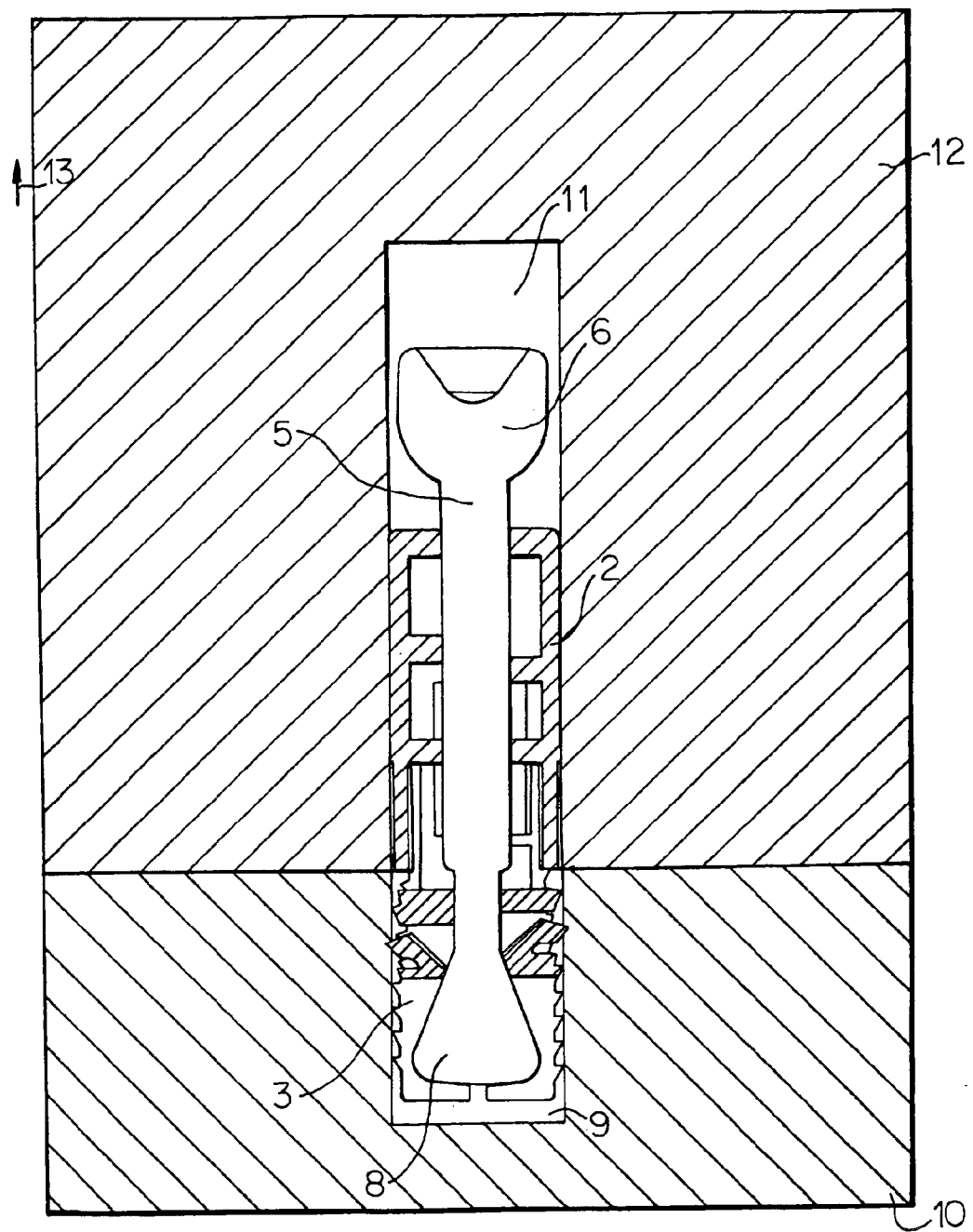
FIG. 3 is a cross-sectional view, similar to FIG. 2, with the second structural component being placed.

The lower part 3 of the sleeve 1 provided with hook-shaped annular ribs 16 is constructed as an expanding sleeve and is placed in a recess 9 of a first structural component 10, as shown in FIG. 2. On the other hand, the upper part 2 of the sleeve 1 is provided with longitudinally directed guide ribs 17 and engages with the bolt head 6 into the recess 11 of a second structural component 12, as shown in FIG. 3. Provided in this structural component 12 is a clamping device, not shown, which makes it possible to slide the bolt head 6, and thus, the bolt 5 in the direction of arrow 13. As a result, the expanding cone 8 of the bolt 5 presses the lower part 3 of the sleeve 1 constructed as an expanding sleeve against the wall of the recess 9 so that a secure support is effected.

The upper part 2 of the sleeve 1 is provided with elastically pivotably braces 14 which extend obliquely outwardly toward the lower part 3 of the sleeve 1 and which can be placed in slots 15 of the upper part 2 of the sleeve 1. As shown in FIG. 2, the free ends of the braces 14 act as a stop and prevent the lower part of the sleeve 1 from extending fully into the recess of the first structural component 10. As soon as the second structural component 12 with its recess 11 has been placed on the sleeve 2, the braces 14 are pivoted into the slots 15, so that the stop effect is cancelled.

If the assembly is carried out in the reverse order, wherein the upper part 2 of the sleeve 1 if inserted with the sleeve head 6 first into the recess 11 of the second structural component 12, the braces 14 are also pivoted into the slots 15 and do not provide a stop effect. Consequently, it is ensured with certainty that the bolt head 6 can be placed in the supporting and clamping device, not shown. The first structural component 10 with its recess 9 is only then placed on the lower part 3 of the sleeve 1 and, subsequently, the bolt 5 is tightened and the sleeve 3 is expanded.

While specific embodiments of the invention have been shown and described in detail to illustrate the inventive principles, it will be understood that the invention may be embodied otherwise without departing from such principles.

I claim:

1. A connecting element for connecting two structural components, the connecting element comprising a sleeve comprising an upper part and a lower part, a bolt having a rearward bolt end and a forward bolt end mounted in the sleeve, wherein the lower part of the sleeve together with the rearward end of the bolt are adapted to engage in a recess of a first structural component and the upper part of the sleeve and the forward end of the bolt are adapted to engage in a recess of a second structural component and a head of the bolt at the forward end of the bolt is adapted to engage in a supporting or clamping device arranged in the second structural component, further comprising at least one brace mounted on a portion of the upper part of the sleeve adjacent the lower part of the sleeve, wherein the at least one brace extends obliquely outwardly towards the lower part of the sleeve and is pivotable towards the sleeve, wherein the upper part of the sleeve has at least one slot, and wherein the brace is pivotable into the slot such that the brace is flush with an outer surface of the sleeve.

2. The connecting element according to claim 1, wherein the at least one brace has a free end adapted as a stop for limiting the depth of penetration of the lower part of the sleeve into the recess.

3. The connecting element according to claim 1, wherein the at least one brace and the sleeve are of the same material.

4. The connecting element according to claim 1, wherein the at least one brace is of an elastic material.

5. The connecting element according to claim 1, wherein the lower part of the sleeve has on an outer circumference thereof hook-shaped annular ribs.

6. The connecting element according to claim 1, wherein the upper part of the sleeve has longitudinally directed guide ribs.

* * * * *